United States Patent
Gao

(10) Patent No.: US 10,104,588 B2
(45) Date of Patent: Oct. 16, 2018

(54) METHOD FOR AUTOMATICALLY SWITCHING AN LBS-BASED WIRELESS DATA NETWORK AND MOBILE TERMINAL

(71) Applicant: HUIZHOU TCL MOBILE COMMUNICATION CO., LTD., Huizhou (CN)

(72) Inventor: Ke Gao, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 100 days.

(21) Appl. No.: 14/915,127

(22) PCT Filed: Jul. 29, 2015

(86) PCT No.: PCT/CN2015/085397
§ 371 (c)(1),
(2) Date: Feb. 26, 2016

(87) PCT Pub. No.: WO2016/138733
PCT Pub. Date: Sep. 9, 2016

(65) Prior Publication Data
US 2016/0381612 A1    Dec. 29, 2016

(30) Foreign Application Priority Data

Mar. 4, 2015    (CN) .......................... 2015 1 0095773

(51) Int. Cl.
H04W 4/00        (2018.01)
H04W 36/14       (2009.01)
(Continued)

(52) U.S. Cl.
CPC ............ *H04W 36/14* (2013.01); *H04W 4/02* (2013.01); *H04W 36/165* (2013.01); *H04W 48/16* (2013.01); *H04W 64/00* (2013.01); *H04W 84/10* (2013.01); *H04W 92/04* (2013.01); *H04W 92/16* (2013.01)

(58) Field of Classification Search
None
See application file for complete search history.

(56) References Cited

U.S. PATENT DOCUMENTS 8,073,441 B1 * 12/2011 Unger .................. H04W 48/18
455/404.2
8,428,618 B2 *  4/2013 Fano ...................... G06Q 10/10
370/259

(Continued)

FOREIGN PATENT DOCUMENTS

CN    102948220    2/2013
CN    104717610    6/2015

*Primary Examiner* — Bob Phunkulh
(74) *Attorney, Agent, or Firm* — Shimokaji IP

(57) ABSTRACT

A method for automatically switching an LBS-based wireless data network and a mobile terminal may include recording based on LBS, when the mobile terminal enables wireless data, login information and logins of the wireless data network in the current location, updating a network information list, establishing, based on logins, a wireless data network connection priority, searching a corresponding high-priority network when the location is changed, and sending a prompt to switch a network and log into a high-priority wireless data network.

20 Claims, 2 Drawing Sheets

(51) Int. Cl.
*H04W 4/02* (2018.01)
*H04W 36/16* (2009.01)
*H04W 48/16* (2009.01)
*H04W 92/16* (2009.01)
*H04W 84/10* (2009.01)
*H04W 92/04* (2009.01)
*H04W 64/00* (2009.01)

(56) References Cited

U.S. PATENT DOCUMENTS

| | | | | |
|---|---|---|---|---|
| 8,635,335 B2* | 1/2014 | Raleigh | ............... | H04W 36/245 455/456.3 |
| 8,793,776 B1* | 7/2014 | Jackson | ............... | H04W 4/023 726/7 |
| 9,414,189 B2* | 8/2016 | Chen | ............... | H04W 4/02 |
| 9,532,261 B2* | 12/2016 | Raleigh | ............... | H04W 36/245 |
| 2005/0003816 A1* | 1/2005 | Vardoulias | ............... | H04W 48/18 455/435.2 |
| 2007/0066304 A1* | 3/2007 | Lee | ............... | H04W 48/20 455/436 |
| 2008/0076436 A1* | 3/2008 | Sanders | ............... | H04W 76/025 455/450 |
| 2008/0119203 A1 | 5/2008 | Shalmon | | |
| 2009/0109942 A1* | 4/2009 | Wijayanathan | ..... | H04W 76/048 370/338 |
| 2009/0192709 A1* | 7/2009 | Yonker | ............... | H04W 4/029 701/470 |
| 2010/0015993 A1 | 1/2010 | Dingier | | |
| 2012/0089845 A1* | 4/2012 | Raleigh | ............... | H04L 12/14 713/176 |
| 2012/0120913 A1* | 5/2012 | Wirtanen | ............... | H04W 36/0027 370/331 |
| 2013/0132854 A1* | 5/2013 | Raleigh | ............... | G06F 3/0482 715/738 |
| 2013/0208713 A1* | 8/2013 | Hamade | ............... | H04W 88/08 370/338 |
| 2014/0023059 A1* | 1/2014 | Gupta | ............... | H04W 36/34 370/338 |
| 2014/0024340 A1* | 1/2014 | Raleigh | ............... | H04M 15/00 455/406 |
| 2014/0094159 A1* | 4/2014 | Raleigh | ............... | H04W 24/02 455/418 |
| 2014/0098671 A1* | 4/2014 | Raleigh | ............... | H04M 15/80 370/235 |
| 2014/0162648 A1* | 6/2014 | Cui | ............... | H04W 48/18 455/435.3 |
| 2014/0274035 A1* | 9/2014 | Unger | ............... | H04W 48/18 455/432.1 |
| 2015/0333975 A1* | 11/2015 | Sathyanath | ............... | H04L 63/08 726/3 |
| 2016/0007274 A1* | 1/2016 | Park | ............... | H04W 48/16 455/434 |

* cited by examiner

METHOD FOR AUTOMATICALLY SWITCHING AN LBS-BASED WIRELESS DATA NETWORK AND MOBILE TERMINAL

TECHNICAL FIELD

The present invention relates to the field of a mobile terminal, and more particularly, to a method for automatically switching an LBS-based wireless data network and a mobile terminal.

BACKGROUND

People may be increasingly dependent on smart mobile devices or wireless network in their daily work and lives. Limited by traffic or signal quality or the like, a user may select to use different networks at different locations, and these locations may use fixed networks. Everyday range of movement of people may be limited, and may include: At home, on the way to/from work, at an office, or at a supermarket/mall. Network connections in different regions may need to be implemented manually, and a username and a login password may need to be inputted, which is may be very cumbersome. Therefore, the prior art needs to be improved and developed.

SUMMARY

A method for automatically switching an LBS (location-based service)-based wireless data network and a mobile terminal, may automatically switch a wireless data network connection and improve a user experience.

A method for automatically switching an LBS-based wireless data network may include:

recording based on LBS, when a mobile terminal enables wireless data, login information and logins of the wireless data network in a current location, and updating a network information list;

establishing, based on logins of the wireless data network in the LBS current location, a wireless data network connection priority, and marking a corresponding wireless data network connection priority in the network information list; and searching, from the network information list, a high-priority network corresponding to the LBS-based current location information when the location of the mobile terminal is changed, sending a prompt to switch a network and logging into the high-priority wireless data network.

In the method for automatically switching an LBS-based wireless data network, before the recording step the method may further include:

establishing a network information list;

where the network information list includes: login time, a network type, a username, a login password, a login location, logins, login time and priority.

In the method for automatically switching an LBS-based wireless data network, the establishing step may include the following:

establishing, based on logins of the wireless data network in the LBS current location, a wireless data network connection priority, wherein the larger the number of logins of the LBS-based wireless network, the higher the wireless network connection priority.

In the method for automatically switching an LBS-based wireless data network, the searching step may include the following:

searching, from the network information list, a high-priority network corresponding to the LBS-based current location information when the location of the mobile terminal is changed, and automatically switching, if the currently used network is not matched with a searched high-priority network, to the searched high-priority network.

In the method for automatically switching an LBS-based wireless data network, the searching step may further include:

acquiring based on LBS, when a user restarts a wireless data connection, current location information of the user, and searching, from the network information list, a high-priority network corresponding to LBS-based current location information for connection.

In an embodiment, a mobile terminal corresponding to the method for automatically switching an LBS-based wireless data network may include:

a recording module, configured to record based on LBS, when the mobile terminal enables wireless data, login information and logins of the wireless data network in a current location, and update a network information list;

a priority module, configured to establish, based on logins of the wireless data network in the LBS current location, a wireless data network connection priority, and mark a corresponding wireless data network connection priority in the network information list; and a network switching module, configured to search, from the network information list, a high-priority network corresponding to the LBS-based current location information when the location of the mobile terminal is changed, send a prompt to switch a network and log into the high-priority wireless data network.

The foregoing mobile terminal may further include:

a preset module, configured to establish a network information list;

wherein the network information list includes: login time, a network type, a username, a login password, a login location, logins, login time and priority.

In the foregoing mobile terminal, the priority module may include a priority ordering unit, configured to establish, based on logins of the wireless data network in the LBS current location, a wireless data network connection priority, wherein the larger the number of logins of the LBS-based wireless network, the higher the wireless network connection priority.

In the foregoing mobile terminal, the network switching module may include:

a first network switching module, configured to search, from the network information list, a high-priority network corresponding to the LBS-based current location information when the location of the mobile terminal is changed, and automatically switch, if the currently used network is not matched with a searched high-priority network, to the searched high-priority network.

In the foregoing mobile terminal, the network switching module may further include:

a second network switching module, configured to acquire based on LBS, when a user restarts a wireless data connection, current location information of the user, and search, from the network information list, a high-priority network corresponding to LBS-based current location information for connection.

The method for automatically switching an LBS-based wireless data network and the mobile terminal may enable, based on LBS, a mobile device to automatically switch, according to automatically recorded information such as a network used by a user in different regions, a username and password or the like, and connect to the network when the user moves within the region again, thereby reducing manual operation for the user. Therefore, traffic and connection time are saved for the user, convenience is provided for the user, and new functions are added for the terminal device.

DETAILED DESCRIPTION

The present invention may provide a method for automatically switching an LBS-based wireless data network and a mobile terminal. To make the objectives, technical solutions, and effects of the present invention clearer, the following further describes in detail the present invention with reference to the accompanying drawings and embodiments. It is to be understood that the embodiments described herein are only intended to explain the present invention, and are not restrictive of the present invention.

Figure 1:
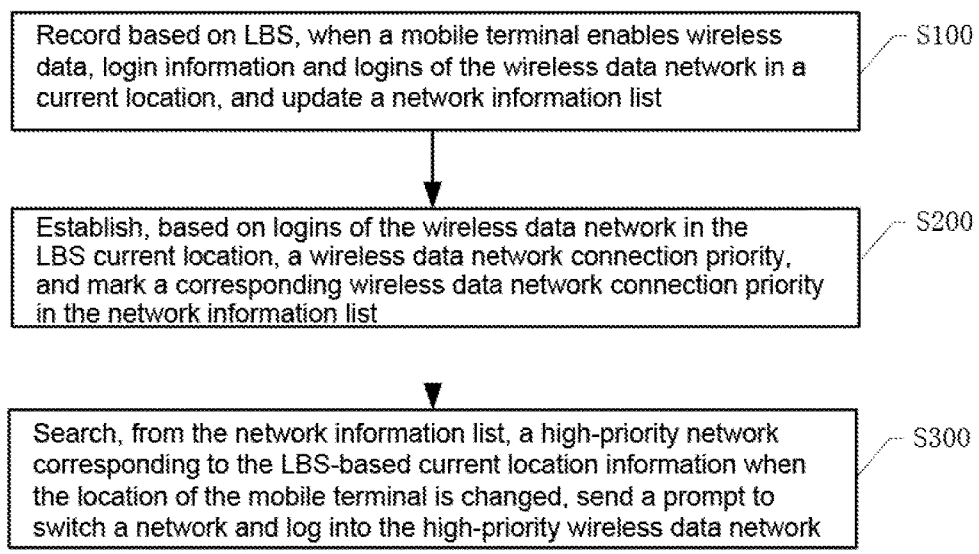
FIG. 1 is a flowchart of the method for automatically switching an LBS-based wireless data network in the present invention.

Referring to FIG. 1, the method for automatically switching an LBS-based wireless data network provided by the present invention may include the following steps:

S100: record based on LBS, when a mobile terminal enables wireless data, login information and logins of the wireless data network in a current location, and update a network information list.

When the user uses a terminal device to start wireless data, the terminal device may position the user's geographical location or geodetic coordinates by means of a radio communications network according to a location based service. Based on the current location of the user, the terminal device may record, when the user connects the wireless data, the user's login information for connecting to the wireless data network and logins in this location. If the wireless data used by the user is a wireless data network, a username and a login password may be recorded as null, and this login may be recorded as an $n^{th}$ login. If the network connected by the user based on the current location is a WIFI network, the username and the login password used by the user for logging into the WIFI network may be recorded, and this login may be recorded as an $n^{th}$ login. It may be recorded as 1 if this login is the first login, and it may be recorded as 2 if this login is the second login, and so on.

In an embodiment, the network information list may be updated, i.e., the foregoing recorded data may be updated into the network information list. Before use a network information list may need to be established in the terminal device. The network information list may be configured to automatically connect, by the terminal device based on different locations, to a network.

S200: establish, based on logins of the wireless data network in the LBS current location, a wireless data network connection priority, and mark a corresponding wireless data network connection priority in the network information list.

The terminal device may position the user's current location area according to a location based service (LBS). The wireless data network within the current area should be corresponding to location information in the network information list. When the user enables a wireless data connection of the terminal device, the terminal device may perform statistical calculation on logins of the wireless data network within the location area. For example, within the current location area there may be a WIFI network to which the user frequently connects, and the number of connections may be more than that of other networks such as a wireless mobile network. The WIFI network may be higher in priority than other networks, and when the terminal device is within the current location area, the WIFI network may be a priority connection network of the terminal device.

The terminal device may update recorded wireless data network login information corresponding to a certain location area into the network information list. Each time the terminal device connects to a certain wireless data network, the number of logins may accumulate once. The wireless data network having the largest number of logins may be denoted as having the highest connection priority, and connection priorities of wireless data networks within the location area may be marked so that it may be automatically switched to the network for the user when the user moves within the location area next time.

S300: search, from the network information list, a high-priority network corresponding to the LBS-based current location information when the location of the mobile terminal is changed, and send a prompt to switch a network and log into the high-priority wireless data network.

When the user moves, the network connection of the terminal device may also change due to limitation of network coverage and with the location change of the user. Because location based service (LBS) is positioned by means of distance measurement of a wireless base station, the terminal device may acquire the network information list according to the location of the wireless base station where different cells are located, and conduct network connections according to connection priorities. During network connections, the user may be reminded of network switching to log into a high-priority wireless data network. However, the user may refuse the connection.

Specifically, first of all a network information list may be established, the username and the login password may be logged into the wireless data network in the current location, and may be recorded based on LBS when the mobile terminal enables wireless data. This login may be recorded as the $n^{th}$ login, and the network information list may be updated. The network information list may include: login time, a network type, a username, a login password, a login location, logins, login time and priority. Network connection priorities of LBS-based wireless data networks in the network information list may be ranked according to logins, and priorities of networks within the cell may be marked successively. A wireless data network connection priority can be established based on the number of logins of the wireless data network in the LBS current location, wherein the larger the number of logins of the LBS-based wireless network, the higher the wireless network connection priority. When the location is changed and the user moves within a certain cell, the terminal may position the user's geographical location according to LBS, and the network information list may be searched corresponding to this cell, and the terminal may connect to a high-priority wireless network in the network information list.

The following further describes the present invention with reference to embodiments, as shown in Table 1:

TABLE 1

| Location | Time | Network type | Username | Password | Logins | Priority |
|---|---|---|---|---|---|---|
| Floor X, Block A, Cell XX | 2014 Nov. 11-19:30 | WiFi network | Abc_wifi | Abc123 | 1 | |
| | 2014 Nov. 12-07:30 | WiFi network | Abc_wifi | Abc123 | 2 | 0 |
| Metro Line X, Avenue XX | 2014 Nov. 12-08:00 | Wireless mobile network | None | None | 1 | 0 |
| Floor X, Block B, Mansion XX | 2014 Nov. 12-08:30 | WiFi network | Office_wifi | Office_012 | 2 | 0 |
| | 2014 Dec. 09-09:30 | Wireless mobile network | None | None | 1 | 1 |
| ... | | | | | | |

In an embodiment, the larger the number of logins of a wireless mobile network in a certain region, the higher the priority of the wireless mobile network may be. Figure 0 stands for the top priority, and the larger a figure is, the smaller the number of logins may be, and the lower the priority may be. In Table 1, when the user is located on Floor X, Block A, Cell XX, the WIFI network connected to for the first time may be a wireless data network named Abc_wifi, whose password may be Abc123, and the terminal device may record the information. When the user is located once again on Floor X, Block A, Cell XX, the terminal device may automatically switch the network connection so that wireless data is connected to a wireless data network whose WIFI network name is Abc_wifi, thereby reducing manual operation for the user and improving the user experience. When the user moves to another cell, for example, Metro Line X, Avenue XX, where no WIFI network is available nearby, the terminal device may automatically switch to the wireless mobile network. As the user's location is changed, the network information list may be constantly refreshed, and automatic network switching can be better implemented based on LBS, and new functions may be added for the terminal device.

In an embodiment, the user may take a bus to work, and on the bus a WIFI network may be provided for the user to connect to. Each time the user logs into the WIFI network, the user may need to manually input the username (a mobile phone number) and the login password, which can be cumbersome. Moreover, it may be difficult to successfully connect in case of a large number of connections. By using the method for automatically switching an LBS-based wireless data network, it may be possible to move as the bus moves, to rapidly connect, based on LBS, to the WIFI network on the bus, and to automatically reconnect in case of a failed connection until it is successfully connected. Thus, traffic and connection time can be saved for the user, convenience is provided for the user, and new functions can be added for the terminal device.

Further, when the location of the mobile terminal is changed in the event that a data connection is available, the network information list can be searched for a high-priority network corresponding to the LBS-based current location information, and the location of the mobile terminal can be automatically switched, if the currently used network is not matched with a searched high-priority network, to the searched high-priority network. When the location of the user is moved, the selected network information list is searched based on an LBS network, for a high-priority network corresponding to the current location information of the user. The location of the user can be automatically switched, if the currently used network is not matched with a searched high-priority network, to the top-priority network. The user can be simultaneously reminded that it the user is to be switched to a commonly used network. The original network may be continued to be used if it is consistent.

In an embodiment, based on LBS, when the user restarts a wireless data connection, the current location information of the user can be acquired, and the network information list can be searched for a high-priority network corresponding to the LBS-based current location information for a connection. When the user starts data traffic in a certain region for data connection, the current location information of the user may be acquired according to the location of a wireless base station where the cell is currently located, then the top-priority connection network within the current region can be searched out in the network information list accessed based on an LBS network.

In an embodiment, the method for automatically switching an LBS-based wireless data network provided by the present invention can enable, based on LBS, a mobile device to automatically switch, according to automatically recorded information such as a network used by the user in different regions, and a username and password or the like, and connect to the network when the user moves within a region again, thereby reducing manual operation for the user and improving the user experience. Therefore, traffic and connection time can be saved for the user, and convenience can be provided for the user.

Figure 2:
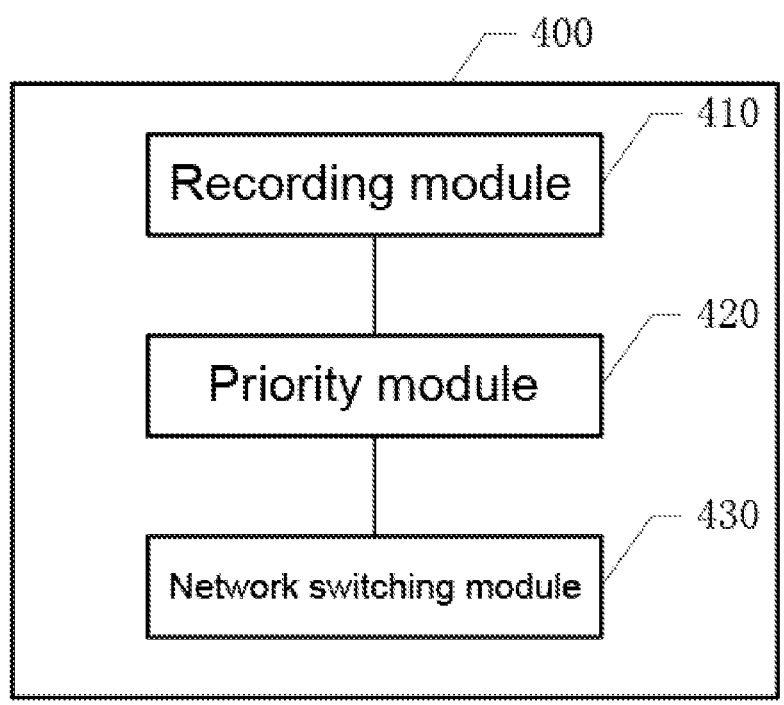
FIG. 2 is a block diagram of the mobile terminal for automatically switching an LBS-based wireless data network in the present invention.

In FIG. 2, the present invention may further provide a mobile terminal 400, including:

a recording module 410, configured to record based on LBS, when the mobile terminal enables wireless data, login information and logins of the wireless data network in a current location, and update a network information list as mentioned above;

a priority module 420, configured to establish, based on logins of the wireless data network in the LBS current location, a wireless data network connection priority, and mark a corresponding wireless data network connection priority in the network information list, as mentioned above; and a network switching module 430, configured to search, from the network information list, a high-priority network corresponding to the LBS-based current location information when the location of the mobile terminal is changed, send a prompt to switch a network and log into the high-priority wireless data network, as mentioned above.

The mobile terminal 400 may further include: a preset module, configured to establish a network information list.

The network information list may include: login time, a network type, a username, a login password, a login location, logins, login time and priority, as mentioned above.

In the mobile terminal, the priority module 420 may include a priority ordering unit, configured to establish, based on logins of the wireless data network in the LBS current location, a wireless data network connection priority, wherein the larger the number of logins of the LBS-based wireless network, the higher the wireless network connection priority may be.

In the mobile terminal, the network switching module 430 may include: a first network switching module, configured to search, from the network information list, a high-priority network corresponding to the LBS-based current location information when the location of the mobile terminal is changed, and automatically switch, if the currently used network is not matched with a searched high-priority network, to the searched high-priority network.

In the mobile terminal, the network switching module 430 can further include: a second network switching module, configured to acquire based on LBS, when a user restarts a wireless data connection, current location information of the user, and search, from the network information list, for a high-priority network corresponding to LBS-based current location information for connection, as mentioned above.

The method for automatically switching an LBS-based wireless data network and the mobile terminal provided by the present invention can enable, based on LBS, a mobile device to automatically switch, according to automatically recorded information such as a network used by the user in different regions, the username and the password, and connect to the network when the user moves within the region again, thereby reducing manual operation for the user and improving the user experience. Therefore, traffic and connection time can be saved for the user, convenience may be provided for the user, and new functions may be added for the terminal device.

It is to be understood that application of the present invention is not limited to the foregoing examples, and those of ordinary skill in the art may make improvements or transformations according to the foregoing description, and all these improvements and transformations should fall within the scope of the appended claims of the present invention.

The invention claimed is:

1. A method for automatically switching an LBS (location-based service)-based wireless data network, comprising:
    recording based on LBS, when a mobile terminal enables wireless data, login information for a wireless data network in a current location and logins by the mobile terminal to the wireless data network of the current location, and updating a network information list by accumulating a number of logins by the mobile terminal to the wireless data network each time the mobile terminal logs in to the wireless data network;
    establishing, based on logins of the wireless data network in the LBS current location, a wireless data network connection priority, and marking a corresponding wireless data network connection priority in the network information list, wherein the number of logins of the LBS-based wireless data network increases correspondingly with the wireless data network connection priority, and the mobile terminal is configured to use the network information list to automatically connect the mobile terminal to the wireless data network using an automatically recorded username and password to log in to the wireless data network; and
    by operation of the mobile terminal, in response to the location of the mobile terminal changing, searching, from the network information list, for a highest priority network corresponding to the LBS-based current location information, and, if the currently used network is not matched with the searched highest priority network, reminding a user of the mobile terminal that the mobile terminal is switching networks, and automatically switching to the searched highest priority wireless data network, wherein the mobile terminal is configured to allow a user to refuse a connection with the searched highest priority wireless data network.

2. The method for automatically switching an LBS-based wireless data network according to claim 1, wherein before the recording step the method further comprises:
    establishing a network information list;
    the network information list comprising: login time, a network type, a username, a login password, a login location, logins, login time and priority.

3. The method for automatically switching an LBS-based wireless data network according to claim 1, wherein the searching step further comprises:
    acquiring based on LBS, when a user restarts a wireless data connection, current location information of the user, and searching, from the network information list, a high-priority network corresponding to LBS-based current location information for connection.

4. The method of claim 1, wherein the switch to the searched highest priority wireless data network occurs without needing to re-enter a user name and password previously entered.

5. The method of claim 1, wherein the mobile terminal automatically reconnects to the searched highest priority wireless data network after a failed connection.

6. A method for automatically switching an LBS (location-based service)-based wireless data network, comprising:
    recording based on LBS, when a mobile terminal enables wireless data, login information and logins of the wireless data network in a current location by the mobile terminal, and updating a network information list of the mobile terminal by accumulating a number of logins by the mobile terminal to the wireless data network each time the mobile terminal logs in to the wireless data network;
    establishing, based on logins of the wireless data network by the mobile terminal in the LBS current location, a wireless data network connection priority, and marking a corresponding wireless data network connection priority in the network information list and the mobile terminal is configured to use the network information list to automatically connect the mobile terminal to the wireless data network using an automatically recorded username and password to log in to the wireless data network; and
    searching, from the network information list, for an updated high-priority network corresponding to the LBS-based current location information when the location of the mobile terminal is changed, and sending a prompt to switch to the updated high-priority network and automatically switching to the updated high-priority network unless the user refuses the connection.

7. The method for automatically switching an LBS-based wireless data network according to claim 6, wherein before the Step A the method further comprises the following steps:
    establishing a network information list;
    the network information list comprising: login time, a network type, a username, a login password, a login location, logins, login time and priority.

8. The method for automatically switching an LBS-based wireless data network according to claim 6, wherein the establishing step comprises:
　　establishing, based on logins of the wireless data network in the LBS current location, a wireless data network connection priority, wherein the number of logins of the LBS-based wireless data network increases correspondingly to the wireless data network connection priority.

9. The method for automatically switching an LBS (location-based service)-based wireless data network according to claim 6, wherein the searching step comprises:
　　searching, from the network information list, a high-priority network corresponding to the LBS-based current location information when the location of the mobile terminal is changed, and automatically switching, if the currently used network is not matched with a searched high-priority network, to the searched high-priority network.

10. The method for automatically switching an LBS-based wireless data network according to of claim 6, wherein the searching step further comprises:
　　acquiring based on LBS, when a user restarts a wireless data connection, current location information of the user, and searching, from the network information list, a high-priority network corresponding to the LBS-based current location information for connection.

11. The method of claim 6, wherein the switch to the searched updated high-priority network occurs without needing to re-enter a user name and password previously entered.

12. The method of claim 6, wherein the mobile terminal automatically reconnects to the searched updated high-priority network after a failed connection.

13. A terminal device including:
　　a mobile terminal configured to communicate with a location-based-service (LBS) and determine when a location of the mobile terminal has changed based on the LBS,
　　wherein the mobile terminal is configured to record based on the LBS, when the mobile terminal enables wireless data, login information and logins of the wireless data network in a current location, and update a network information list;
　　the mobile terminal is configured to establish, based on logins of the wireless data network in the LBS current location, a wireless data network connection priority, and mark a corresponding wireless data network connection priority in the network information list and the mobile terminal is configured to use the network information list to automatically connect the mobile terminal to the wireless data network using an automatically recorded username and password; and
　　the mobile terminal is configured to determine, from the network information list, an updated high-priority network corresponding to the LBS-based current location information when the location of the mobile terminal is changed, remind a user that the mobile terminal is switching networks, and automatically log into the updated high-priority wireless data network unless the user refuses a connection with the updated high-priority wireless data network.

14. The mobile terminal according to claim 13, wherein the mobile terminal is configured to establish a network information list, the network information list comprising: login time, a network type, a username, a login password, a login location, logins, login time and priority.

15. The mobile terminal according to claim 13, wherein the mobile terminal includes a priority ordering unit, configured to establish, based on logins of the wireless data network in the LBS current location, a wireless data network connection priority, wherein the number of logins of the LBS-based wireless network increases correspondingly with increases in the wireless network connection priority.

16. The mobile terminal according to claim 13, wherein the mobile terminal is configured to search, from the network information list, a high-priority network corresponding to the LBS-based current location information in response to the location of the mobile terminal being changed, and automatically switch, if the currently used network is not matched with a searched high-priority network, to the searched high-priority network.

17. The mobile terminal according to claim 13, wherein the mobile terminal is configured to acquire based on LBS, using multiple parallel requests, in response to a user restarting a wireless data connection, current location information of the user, and search, from the network information list, a high-priority network corresponding to LBS-based current location information for connection.

18. The mobile terminal of claim 13, wherein logging into the updated high-priority wireless data network occurs without needing to re-enter a user name and password previously entered.

19. The mobile terminal of claim 13, wherein the mobile terminal automatically reconnects to the updated high-priority wireless data network after a failed connection.

20. The mobile terminal of claim 13, wherein a notification is output when the mobile terminal switches to a commonly used network.

* * * * *